Patented Oct. 10, 1922.

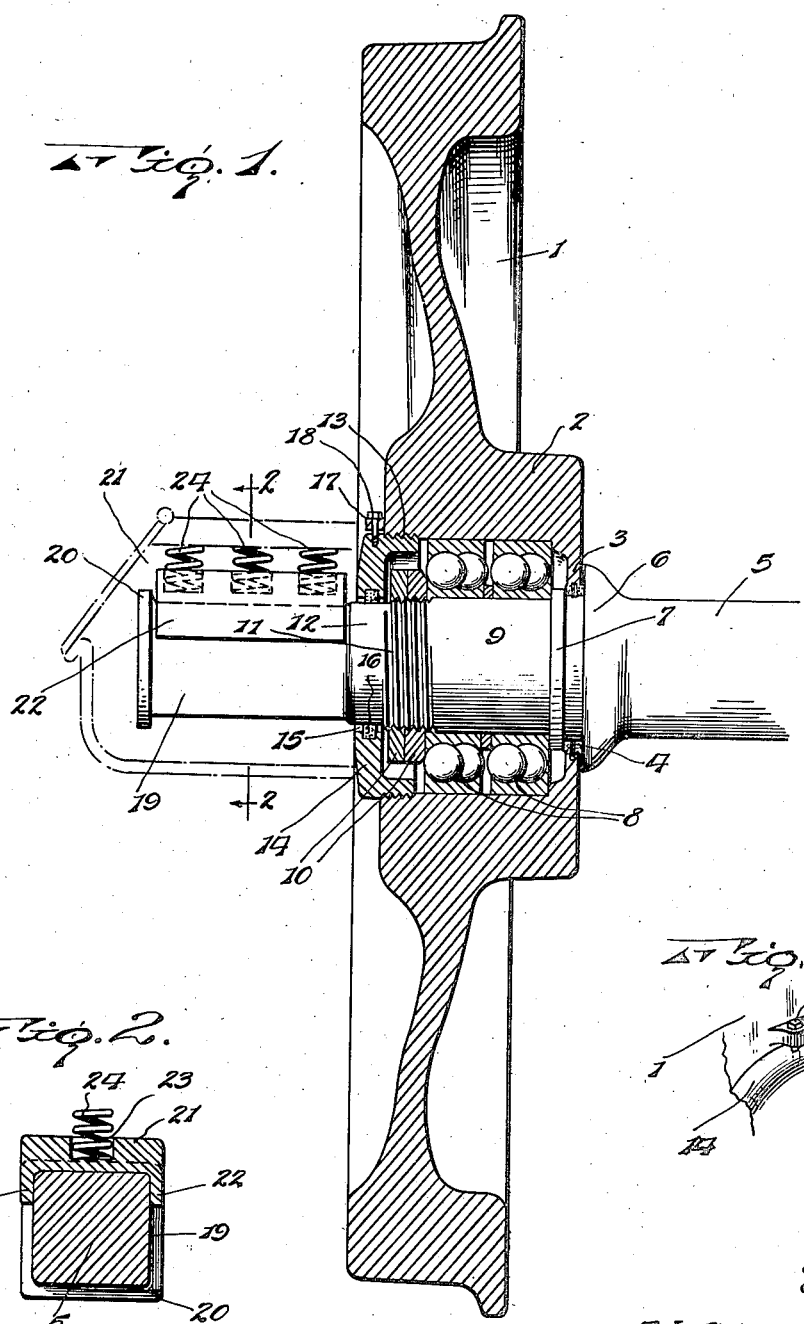

1,431,370

UNITED STATES PATENT OFFICE.

ANDREW L. CARROLL, OF ST. LOUIS, MISSOURI, ASSIGNOR OF ONE-HALF TO JORDAN W. CHAMBERS, OF ST. LOUIS, MISSOURI.

CAR WHEEL.

Application filed March 16, 1922. Serial No. 544,241.

*To all whom it may concern:*

Be it known that I, ANDREW L. CARROLL, a citizen of the United States, residing in the city of St. Louis and State of M'ssouri, have invented certain new and useful Improvements in Car Wheels, of which the following is a specification.

This invention relates to car wheels and seeks to provide a car wheel of simple construction which may rotate readily about a fixed axle and may contain lubricant whereby to enhance its free running qualities. A further object of the invention is to provide a yieldable support between the journal or axle and the journal box whereby the axle will be held against rotation but will have a limited vertical play to accommodate vibration. The invention is illustrated in the accompanying drawings and will be hereinafter fully set forth.

In the drawings—

Figure 1 is a transverse section of a car wheel embodying my invention, the axle being shown in elevation;

Fig. 2 is a detail transverse section on the line 2—2 of Fig. 1;

Fig. 3 is a detail perspective view.

The car wheel 1 may be of the usual form in its tread and web portions and is constructed with a hollow hub 2 having an annular flange 3 at its inner side or end in which web is secured a felt washer 4. The axle 5 is constructed with an annular shoulder or rib 6, against which the inner end of the hub is adapted to bear so that inward movement of the wheel along the axle will be prevented. The axle is further provided with a second annular flange or rib 7 spaced from the rib 6 and of less diameter so that the wheel may be easily slipped over the end of the axle to bring its flange 3 against the flange 6 of the axle, the felt washer 4 fitting closely around the axle between the flanges 6 and 7 to prevent the escape of lubricant. Outwardly beyond the rib or flange 7, the axle is circular in cross section and ball bearings 8 are fitted around the said circular portion 9 of the axle within the hub of the wheel, and lock nuts 10 are fitted upon the threaded portion 11 of the axle so as to retain the ball bearings in their proper position. It will be readily noted that the threaded portion 11 of the axle is of less diameter than the smooth portion 9 thereof, and outwardly beyond the threaded portion 11 is a smooth portion 12 of less diameter than the threaded portion, this form of the axle permitting the several parts to be readily assembled upon the axle. It will, of course, be noted that the hub 2 is chambered to receive the ball bearings and the lock nuts by which they are retained in place and the outer end of the chamber is open and internally threaded, as shown at 13. A cap 14 is engaged in the open outer end of the chamber and this cap is apertured centrally, as at 15, to fit around the axle, a felt washer 16 being carried by the cap within the said aperture to fit closely about the axle and prevent the escape of lubricant. Adjacent the open outer end of the chamber in the hub, a lug or projection 17 is provided on the outer side of the hub, and a set screw 18 is mounted in this projection to engage a threaded socket in the cap 14 and thereby lock the cap in its closed position.

The outer portion of the journal or axle beyond the circular portion 12 is angular in cross section, as shown at 19, and resting upon the said angular portion, between the circular portion 12 and a flange 20 at the extremity of the journal, is a block 21 having depending side flanges or lips 22 which fit against the flat sides of the journal 19 whereby relative rotation of the journal and the block is prevented although the proportions are such as to permit desired vertical movement. In the upper side of the block 21 are sockets or recesses 23 receiving springs 24 which bear against the top of the journal box, indicated in dotted lines in Fig. 1. This arrangement provides a yieldable support between the axle and the journal box so that, while rotation of the axle is prevented, it will have a limited vertical movement and will thereby accommodate itself to the vibrations of the wheel in travel and prolong the life of the structure. While I have shown coiled springs, it is obvious that leaf springs may be used.

After the wheel and the bearings have been assembled upon the axle, lubricant is placed within the chambered hub and the cap 14 is then turned home, the lubricant being confined between the felt washers 4 and 16 so that it will be prevented from escaping and the bearing will be thoroughly lubricated. Movement of the wheel and the bearings endwise of the axle will be prevented by the shoulder 6 and the lock nuts 10 and the parts will consequently be retained in place so that the wheel will run true for a long period. The cap 14 may be readily inserted in the hub and when turned fully home, the set screw 18 is engaged in the socket in the edge of the cap so as to prevent reverse movement of the cap. My improved wheel is exceedingly simple in the construction and arrangement of its parts and may be produced at a low cost.

Having thus described the invention, what is claimed as new is:

1. The combination with a car wheel, of a relatively stationary axle upon which the wheel is mounted to rotate, said axle having an outer end portion of angular cross section, a block resting upon said outer end portion of the axle and having depending flanges engaging the sides thereof, and springs carried by said block to bear against the top of a journal box.

2. The combination of a car wheel having spaced annular shoulders, the shoulder nearer the end of the axle being of less diameter than the other shoulder, the axle being constructed with a threaded portion spaced from the smaller shoulder and a reduced circular portion at the outer side of said threaded portion, a chambered car wheel fitted about the axle and provided at its inner side with an annular flange adapted to fit between the shoulders on the axle, an elastic washer carried by said flange and encircling the axle between the flanges thereon, ball bearings fitted about the axle between the outer shoulder thereon and the threaded portion thereof, lock nuts engaging the threaded portion of the axle and retaining the ball bearings within the chambered hub of the car wheel and about the axle, a cap engaging in the end of the chambered hub over and about the said lock nuts, an elastic washer carried by said cap and encircling the axle, a projection on the outer side of the car wheel, and a set screw mounted in said projection and engaging the cap.

In testimony whereof I affix my signature.

ANDREW L. CARROLL. [L. S.]